United States Patent [19]
MacLaine

[11] Patent Number: 6,079,363
[45] Date of Patent: Jun. 27, 2000

[54] PORTABLE CANINE WASTE STATION

[76] Inventor: Joanne MacLaine, 6700 Franklin Pl., #307, Hollywood, Calif. 90028

[21] Appl. No.: 09/296,076

[22] Filed: Apr. 20, 1999

Related U.S. Application Data

[63] Continuation-in-part of application No. 09/168,033, Oct. 7, 1998, abandoned.

[51] Int. Cl.$^7$ .................................................. A01K 29/00
[52] U.S. Cl. ........................................................ 119/161
[58] Field of Search .................................. 119/161, 165, 119/168, 169

[56] References Cited

U.S. PATENT DOCUMENTS

| | | | |
|---|---|---|---|
| 2,671,427 | 3/1954 | Fell | 119/161 |
| 3,233,588 | 2/1966 | Thomas | 119/161 |
| 3,752,121 | 8/1973 | Brazzell | 119/161 |
| 4,979,469 | 12/1990 | Clark | 119/161 |
| 4,986,218 | 1/1991 | Cassone | 119/169 |
| 5,134,974 | 8/1992 | Houser | 119/168 |

*Primary Examiner*—Thomas Price
*Attorney, Agent, or Firm*—Goldstein & Canino

[57] ABSTRACT

A canine waste station, for use by dogs in carrying out elimination activities, comprising a base tray for supporting a live grass mat, a reservoir for holding a quantity of water, and a wicking system for communicating water from the reservoir to the mat. The wicking system comprises a plurality of wicks which extend from the reservoir to the base tray. The grass mats are supported upon netted bins which have handles to facilitate the easy insertion and removal of the grass mats and maintain contact between the grass mats and the wicks to ensure that the mats remain moist and the grass is kept alive.

20 Claims, 3 Drawing Sheets

PORTABLE CANINE WASTE STATION

CROSS REFERENCES AND RELATED SUBJECT MATTER

This application is a continuation-in-part of patent application Ser. No. 09/168,033 filed in the United States Patent Office on Oct. 7, 1998, now abandoned.

BACKGROUND OF THE INVENTION

The invention relates to a portable canine waste station. More particularly, the invention relates to a device which allows sanitary indoor defecation or urination by a canine.

One of the necessary responsibilities of owning a dog is providing for its waste removal needs. This ordinarily involves bringing the dog outdoors several times a day—every day. Obviously, this task can grow tiresome for a dog owner, and is often cited as the main disadvantage of dog ownership. However, this task can be particularly annoying during inclement weather.

Recently states and cities have enacted statutes and ordinances which regulate "dog walking", and make it more of an unpleasant task. For example, it is now required in many locations that the owner pick up the feces and dispose of it in the trash. In addition, leash laws have been enacted which now require the owner to take a more active role in closely following the dog as it carries out its natural business.

Others have proposed devices which attempt to allow the dog to stay indoors during its waste removal activities.

U.S. Pat. No. 4,986,218 to Cassone discloses a canine lavatory which includes a base member having an absorbent pad for absorbing urine.

U.S. Pat. No. 4,979,469 to Clark discloses a portable pet potty which is precisely shaped an configured to ensure that the dog defecates into a removable drawer through a central hole.

U.S. Pat. No. 3,752,121 to Brazzell discloses an animal commode which uses artificial grass impregnated with an animal attractant for accommodating the animal, but which employs disposable absorbent pads for actually absorbing the animal waste.

U.S. Pat. No. 2,671,427 to Fell discloses a portable animal commode which folds up like an attache case, employs branches as an animal attractant, and uses peat moss as an absorbing element.

While these units may be suitable for the particular purpose employed, or for general use, they would not be as suitable for the purposes of the present invention as disclosed hereafter.

SUMMARY OF THE INVENTION

It is an object of the invention to produce a portable canine waste station which is situated indoors, so as to allow a dog to effectively defecate and urinate indoors.

It is another object of the invention to provide a portable canine waste station which both makes the indoor waste removal comfortable for both the dog and for the human occupants. Accordingly, a layer of live grass "sod" is present in a bottom tray of the device, which provides the dual goals of making the activity more natural for the dog, and of absorbing the urine and thus naturally masking the odor therefrom.

It is a further object of the invention to that the sod is effectively maintained in a moist state so that it may be used for a prolonged period of time before it is replaced with fresh sod. Accordingly, provision is made for communicating fresh water to the sod by means of at least one water reservoir and wicking material which extends in the bottom tray beneath the sod to communicate water from the reservoir.

It is a still further object that the invention is configured to entrap urine when used by a male dog. Accordingly, a back panel is employed to deflect urine toward the sod.

The invention is a canine waste station, for use by dogs in carrying out elimination activities, comprising a base tray for supporting a live grass mat, a reservoir for holding a quantity of water, and a wicking system for communicating water from the reservoir to the mat. The wicking system comprises a plurality of wicks which extend from the reservoir to the base tray. The grass mats are supported upon netted bins which have handles to facilitate the easy insertion and removal of the grass mats and maintain contact between the grass mats and the wicks to ensure that the mats remain moist and the grass is kept alive.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
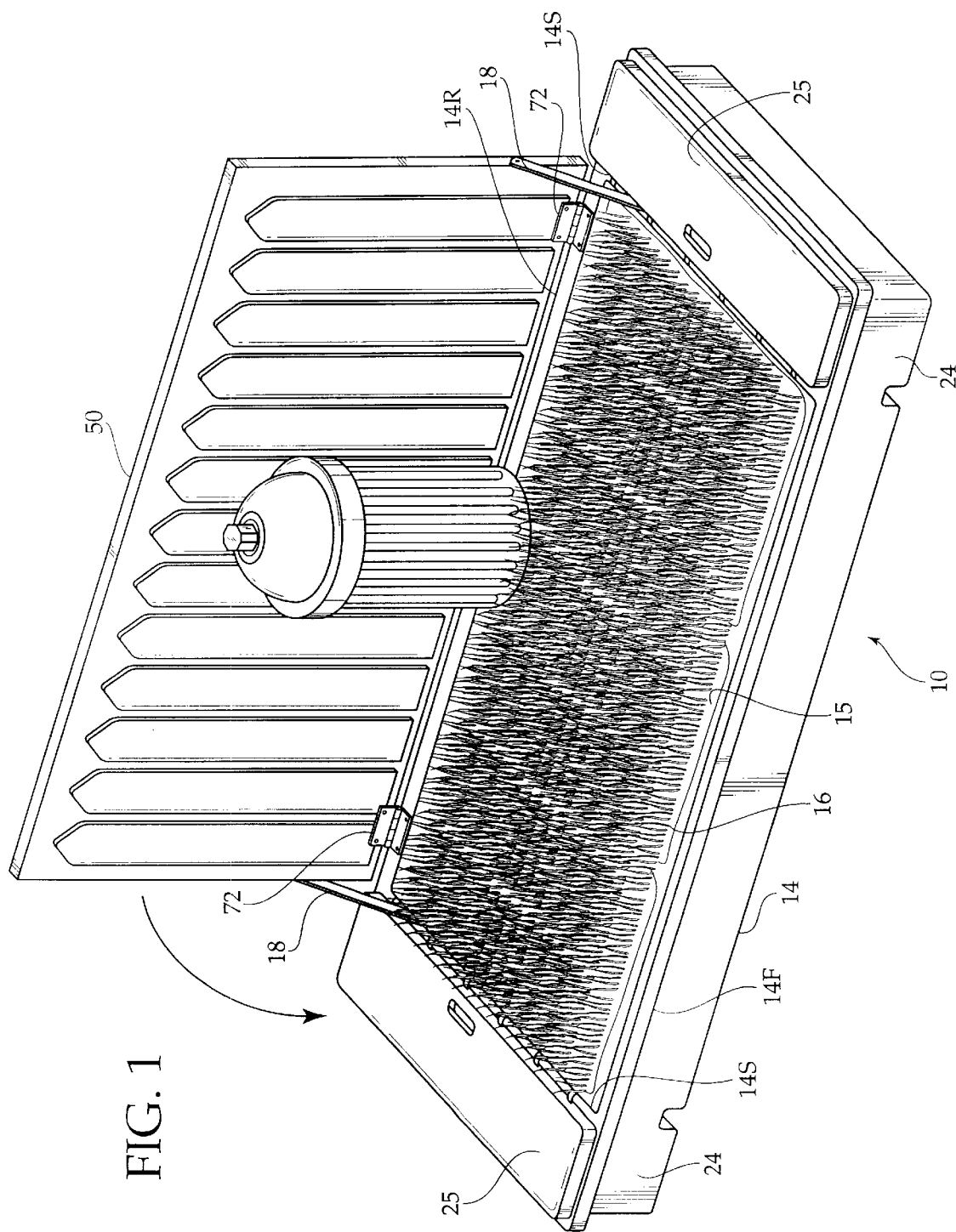
FIG. 1 is a diagrammatic perspective view of the canine waste station, per se.

FIG. 1 illustrates a portable canine waste station 10 for use in facilitating indoor defecation and urination by a dog, comprising a base tray 14, preferably rectangular in shape, having a tray front 14F and tray rear 14R and tray sides 14S. The base tray 14 has a lip 15 which extends fully around its perimeter.

A plurality of live grass mats 16 are selectively held within the tray 14. The live grass mats perform the dual function of providing a natural and desirable location for the dog to carry out elimination activities, and also acting as an effective absorber of urine. The live grass mat 16 is provided in the form of "sod" which is grass in a base of soil of a thickness of approximately two or three inches, the soil held together by roots of the grass. Preferably the grass chosen is of a species which is best suited for withstanding the acidic nature of urine. Preferably the base tray 14 is sized so as to contain three grass mats 16, each approximately sixteen by twenty-four inches in size. The size of the tray 14 and thus the grass mats 16 may of course be varied with empirical experimentation to accommodate dogs of different sizes.

One or more reservoirs 24 are located immediately adjacent to the base tray 14. Two reservoirs 24 are preferably located at the tray sides 14S, and are each capable of holding a quantity of water which is used to keep the grass moist in a manner which will be further described hereinafter. In addition, the reservoirs 24 are preferably molded along with the tray 14 so as to form a single integral piece therewith. The reservoirs 24 are each covered with a removable lid 25 to prevent the dog from stepping in the water contained within the reservoir 24.

The waste station 10 also has a back panel 50, located along the tray rear 14R, for deflecting urine toward the tray 14 when the waste station 10 is used by a male dog. The back panel 50 is hinged to the base tray 14 with a pair of hinges 72 so that the back panel 50 can easily fold down to facilitate transportation and storage of the waste station 10. Supports 18, extending between the back panel 50 and tray rear 14R, may be selectively engaged to maintain the back panel 50 in a upright position.

The back panel 50 may also have ornamental elements which enhance the appearance of the waste station 10 to both the dog and human occupants of a dwelling within the waste station 10 is situated. For example, a picket fence and fire hydrant may be simulated in relief on the back panel 50 to create an appealing look. These ornaments might also be employed to contain an animal attractant to facilitate the dog's use of the waste station 10. For example, according to one embodiment of the invention, the simulated fire hydrant may contain a small cup which holds such an animal attractant.

Figure 2:
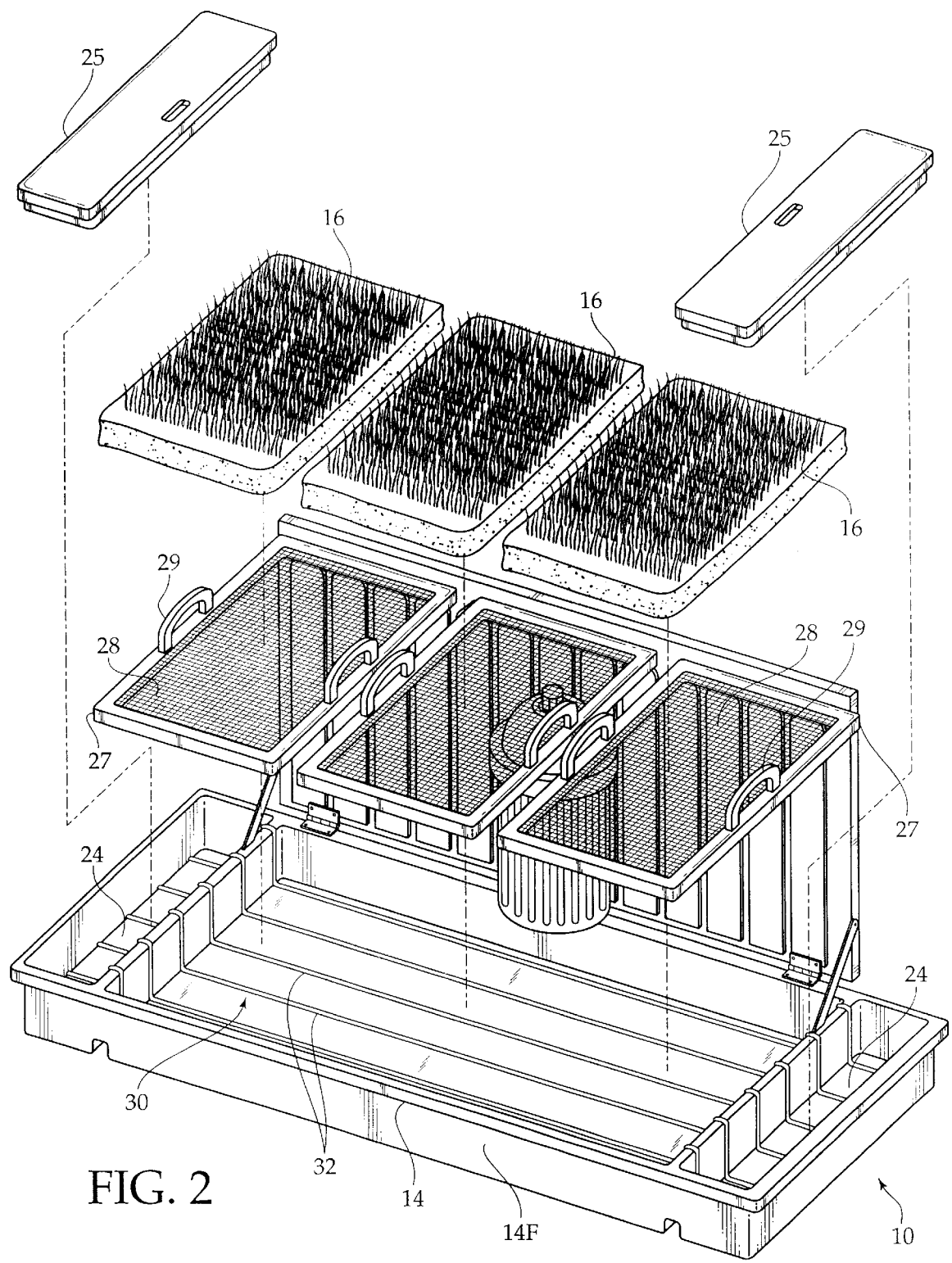
FIG. 2 is an exploded view of the canine waste station, illustrating the relative placement of the sod in the base tray, over the wicking.

Referring now to FIG. 2, an exploded view of the waste station 10 is provided. As illustrated a wicking system 30 communicates water from the reservoirs 24 to the tray 14. The wicking system 30 preferably comprises a plurality of wicks 32 which extend from one reservoir 24 into the base tray 14, across the base tray 14 parallel to the tray front 14F, and then into the other reservoir 24. The lids 25 are preferably notched, to allow the wicks 32 to extend out of the reservoir 24, while still allowing the lids 25 to close tightly against the reservoir 24.

The grass mats 16 are supported within the tray 14 upon netted bins 27 which comprise a netted base 28 and a pair of handles 29 which facilitate insertion and removal of the grass mats 16. The netted bins 27 rest side by side within the tray 14, in close proximity to one another to ensure a substantially uniform coverage of the base tray 14 with the grass mats 16. Since during use the netted base 28 rests upon the wicking 30, the netted base 28 must be permeable so as to allow communication of water from the wicks 32 and the grass mats 16. It is contemplated that the grass mats 16 be replaced approximately every two weeks, or as often as hygienic considerations dictate.

Figure 3:
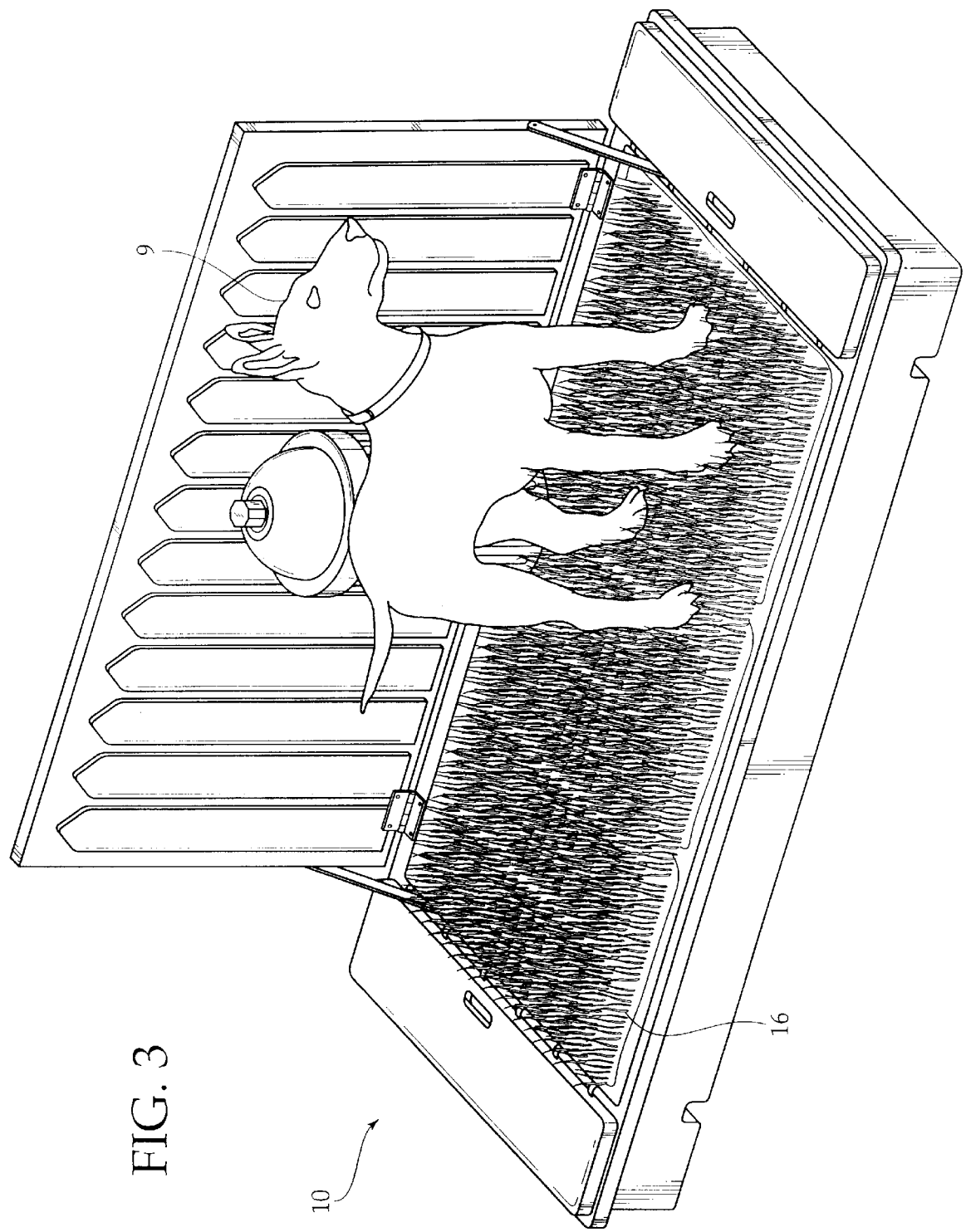
FIG. 3 is a diagrammatic perspective view of the canine waste station in use.

FIG. 3 illustrates the invention in use. A canine 9 is standing upon the grass mats 16 just prior to performing an elimination activity.

In conclusion, herein is presented a canine waste station 10 which allows a dog to effectively defecate or urinate indoors, upon a live grass mat which provides the dual function of absorbing odors and providing the dog with a natural environment to carry out elimination activities.

What is claimed is:

1. A canine waste station, for use by a dog in carrying out elimination activities upon a live grass mat, comprising:
   a base tray having a perimeter including a tray front, a tray rear, and tray sides, for holding at least one grass mat;
   at least one reservoir, located adjacent to the base tray, for holding a quantity of water;
   a wicking system for communicating water from the reservoir to the base tray for keeping the grass mat moist.

2. The canine waste station as recited in claim 1, wherein the wicking system comprises a plurality of wicks, which each extend from the reservoir into the base tray, and extend across the base tray parallel to the tray front.

3. The canine waste station as recited in claim 2, further comprising a back panel extending upward from the tray rear for deflecting urine when a male dog urinates therein.

4. The canine waste station as recited in claim 3, comprising two reservoirs, each reservoir located adjacent to one of the tray sides.

5. The canine waste station as recited in claim 4, wherein back panel is attached to the tray rear with at least one hinge, so that the back panel may be folded downward upon the base tray to facilitate transporting and storage of the waste station.

6. The canine waste station as recited in claim 5, further comprising netted bins, each having a permeable netted base and handles, the grass mats rest upon the netted base and the netted bins rest in the base tray upon the wicking to facilitate easy and clean insertion and removal of the grass mats and to ensure the communication of moisture between the wicking and the grass mats.

7. The canine waste station as recited in claim 6, wherein back panel further comprises ornamental features in the form of a simulated picket fence and a simulated fire hydrant for enticing the dog to use the canine waste station.

8. The canine waste station as recited in claim 7, further comprising a lid associated with each reservoir, for selectively covering that reservoir to ensure that the dog does not inadvertently step in the reservoir.

9. The canine waste station as recited in claim 8, wherein each reservoir lid is notched to allow the wicks to extend out of the reservoir while still allowing said lid to close tightly against the reservoir.

10. The canine waste station as recited in claim 9, wherein the reservoirs are integral with the base tray.

11. A canine waste station, for use by a dog in carrying out elimination activities, comprising:
    at least one live grass mat comprising living grass;
    a base tray having a perimeter including a tray front, a tray rear, and tray sides, for holding the grass mat;
    at least one reservoir, located adjacent to the base tray, for holding a quantity of water;
    a wicking system for communicating water from the reservoir to the base tray for keeping the grass mat moist and alive.

12. The canine waste station as recited in claim 11, wherein the wicking system comprises a plurality of wicks, which each extend from the reservoir into the base tray, and extend across the base tray parallel to the tray front.

13. The canine waste station as recited in claim 12, further comprising a back panel extending upward from the tray rear for deflecting urine when a male dog urinates therein.

14. The canine waste station as recited in claim 13, comprising two reservoirs, each reservoir located adjacent to one of the tray sides.

15. The canine waste station as recited in claim 14, wherein back panel is attached to the tray rear with at least one hinge, so that the back panel may be folded downward upon the base tray to facilitate transporting and storage of the waste station.

16. The canine waste station as recited in claim 15, further comprising netted bins, each having a permeable netted base and handles, the grass mats rest upon the netted base and the netted bins rest in the base tray upon the wicking to facilitate easy and clean insertion and removal of the grass mats and to ensure the communication of moisture between the wicking and the grass mats.

17. The canine waste station as recited in claim 16, wherein back panel further comprises ornamental features in the form of a simulated picket fence and a simulated fire hydrant for enticing the dog to use the canine waste station.

18. The canine waste station as recited in claim 17, further comprising a lid associated with each reservoir, for selectively covering that reservoir to ensure that the dog does not inadvertently step in the reservoir.

19. The canine waste station as recited in claim 18, wherein each reservoir lid is notched to allow the wicks to extend out of the reservoir while still allowing said lid to close tightly against the reservoir.

20. The canine waste station as recited in claim 19, wherein the reservoirs are integral with the base tray.

* * * * *